United States Patent Office 3,374,206
Patented Mar. 19, 1968

3,374,206
POLYCONDENSING A DIENE WITH POLYTHIOFORMALDEHYDE
Bernard Gourdon, Pau, Basses-Pyrenees, France, assignor to Societe Nationale des Petroles d'Aquitaine, Paris, France
No Drawing. Filed Mar. 2, 1965, Ser. No. 436,682
Claims priority, application France, Mar. 4, 1964, 966,001
11 Claims. (Cl. 260—73)

The present invention relates to new sulphur containing polymers and particularly to diene polymers which contain monothiomethylene groups in their molecule. It is also concerned with a process for the preparation of these new polymers.

It is frequently advantageous to introduce sulphur into plastic materials and this operation can be carried out in various ways; usually, however, it is not possible to synthesize polymers containing sulphur in the desired and well established form; frequently even the structure of the materials obtained as well as the position of the sulphur in their molecules are not known.

The present invention, which is concerned with the synthesis of a new sulphur plastic material has inter alia the advantage of the sulphur being introduced into the polymers in a well established form, particularly in the form of $—CH_2S—$ groups. On the other hand, it enables the proportion of these groups in the macromolecules of the material to be prepared to be varied at will. In particular, a wide range of synthetic polymers can be obtained with sulphur contents which vary between approximately 10 and 60% by weight.

The new process according to the invention consists in polycondensing at least one diene with a polythioformaldehyde.

According to one particular feature of the invention, the polythioformaldehydes used for the polycondensation with the dienes are oligomers of the $HS(CH_2S)_nH$ type, in which the number $n$ is usually between 2 and 8.

The preparation of the elastomers according to the invention is particularly simple when using liquid oligomeric polythioformaldehydes and especially those in which the total number $n$ of $—CH_2S—$ groups is 3 to 4.

According to the invention, a diene, as for example butadiene, pentadiene, particularly isoprene, hexadiene, or others, is mixed with the polythioformaldehyde and the mixture is subjected to the action of one of the known polymerisation catalysts.

One particular case which is very practical industrially consists in causing one molecule of a liquid mixture of the aforesaid polythioformaldehydes with a molecular weight equal to or in the region of 190 to react with one molecule of a conjugated or non-conjugated diene, and more especially butadiene or methyl butadiene.

New products according to the invention can also be obtained by the combination of the aforesaid polythioether thiols with other conjugated diolefines, for example: 1,3-hexadiene; 1,3-heptadiene; 1,3-octadiene and 3,5-octadiene; 6-methyl 1,3-heptadiene; 1,3-dodecadiene and 4,6-dodecadiene; 1-methyl 1,3-undecadiene; 3-propyl 1,3-undecadiene; 3-ethyl 1,3-decadiene; 2-ethyl 4,6-decadiene; 1,3-tetradecadiene; 3-ethyl 1,3-tetradecadiene; 7,9-heptadecadiene; 7-methyl 7,9-heptadecadiene; 2,4-docosadiene.

On the other hand, the process according to the invention can also be applied to unconjugated diolefines, as for example 1,5-hexadiene; 1,5-heptadiene; 1,7-octadiene; 5-methyl 1,5-heptadiene; 2-methyl 1,7-octadiene; 2,6-octadiene; 8-ethyl 1,8-decadiene; 10-ethyl 1,9-dodecadiene; 6-butyl 2,10-hexadecadiene; 1,6-docosadiene, etc.

Generally various dienes may be used and more especially those which have 4 to 30 carbon atoms in their molecule.

One highly practical form of embodiment consists in producing the polycondensation of the two reagents in aqueous emulsion in the presence of ingredients, the use of which is known in this type of polymerisation reaction. It is known particularly that such a procedure carried out in emulsion comprises the addition of emulsifiers, thickeners, as for example polyvinyl alcohol, and inorganic salts, which are frequently formed by disodium phosphate.

In the preparation according to the invention, it is possible to use conventional catalysts, that means as well those of the free radical type, particularly persalts, peroxides, azo-bis-alkylnitriles, and so on, as well as those of the Redox systems, for example mixtures of peroxides, sulphite and a ferrous salt. In many cases, the oxido-reduction systems are particularly advantageous.

The polycondensation can be carried out at temperatures usually employed in this type of operation, namely, between 20° and 80° C. and more particularly between 40° and 80° C., for variable periods of time, usually between 10 and 40 hours.

In general, all other conditions being equal, the raising of the temperature results in an increase of the sulphur content in the product obtained; the duration of heating period acts in the same sense.

The sulphur content in the polymer according to the invention depends on the other hand on the type of catalyst employed and obviously on the proportion of polythioformaldehyde added to the dienes.

As regards this last factor, this may be largely used for obtaining a variety of polymers having desired properties which may differ more or less strongly from the polydienes themselves. For example, the polycondensation according to the invention, that is to say, the polymerisation of the diene in the presence of the polythioformaldehyde, can be effected by using 0.1 to 10 moles of this latter per mole of diene. Very interesting products are obtained with 0.5 to 2 moles of liquid polythioformaldehyde oligomer to 1 mole of diene.

In order to illustrate the invention, a few non-limiting examples of the application thereof are given below. In these examples, there are described preparations of rubber-like product by polycondensation in emulsion, carried out in a cylindrical reactor equipped with a turbo-emulsifier and an efficient cooling arrangement for keeping the temperature at the required value.

Example 1

Operation is carried out with the mixture:

| | G. |
|---|---|
| Distilled water | 400 |
| Freshly distilled isoprene | 40 |
| Liquid polythioformaldehyde oligomer, containing altogether 3.5 $CH_2S$ groupings in its molecule | 160 |
| Sodium oleate | 20 |
| Polyvinyl alcohol | 10 |
| Disodium phosphate | 10 |

By stirring this mixture, a stable emulsion is formed, into which 5 g. of azo-bis-isobutyronitrile are introduced. Keeping the temperature at 40° C., stirring is continued for 13 hours. After this time, the mixture is allowed to cool and the forming latex is poured into a vessel which contains acetone; a rubber-like mass accumulates at the bottom of the vessel. This mass is washed several times with acetone. In the product, once it is dry, there are found 30% by weight of combined sulphur.

Example 2

Under the conditions of Example 1, the polycondensation of 80 g. of polythioformaldehyde is effected with only 40 g. of isoprene. The product obtained contains about 17% of combined sulphur.

Example 3

The mixture subjected to the operation has the composition:

|   | G. |
|---|---|
| Water | 500 |
| Oligomer | 125 |
| Isoprene | 68 |
| Sodium oleate | 20 |
| Polyvinyl alcohol | 10 |
| Disodium phosphate | 10 |

The catalyst used in this case is potassium persulphate (5 g.). After 22 hours at 55° C., a mass having the appearance of rubber and containing 37.25% of sulphur is obtained by coagulating the latex in acetone; this product has a softening point of 130° C. and it melts at 190° C.; it starts to decompose at 220° C.

Example 4

The following mixture is treated:

|   | G. |
|---|---|
| Water | 500 |
| Isoprene | 68 |
| Oligomer | 125 |
| Sodium oleate | 20 |
| Polyvinyl alcohol | 20 |
| Disodium phosphate | 10 |
| Potassium persulphate | 5 |
| Azo-bis-isobutyronitrile | 5 |

After stirring for 21 hours at 55° C., a product melting at 150° C., having the appearance of rubber and containing 43% of combined sulphur is obtained by coagulation in methyl alcohol; the softening point of this product is 135° C. and it starts to decompose at 200° C.

Example 5

The mixture subjected to polycondensation comprises:

|   | G. |
|---|---|
| Isoprene | 160 |
| Oligomer | 40 |
| Water | 400 |
| "Texapon Z" (trademark) | 5 |

Catalyst: 2 g. of benzoyl peroxide; 2 g. of sodium sulphite; 0.5 g. of ferrous sulphate.

The operation lasts 15 hours at 30° C.

After coagulation, a mass of rubber-like appearance and containing 34% of sulphur is obtained.

Example 6

|   | G. |
|---|---|
| Water | 500 |
| Sodium oleate | 10 |
| Polyvinyl alcohol | 10 |
| Disodium phosphate | 5 |
| Isoprene | 68 |
| Same thioformaldehyde oligomer as in the preceding examples | 97.5 |

Catalyst: 5 g. of potassium persulphate.

The proportion in this case is 1 mole of isoprene to ½ of oligomer. After a reaction period of 20 hours, a product containing 8% of sulphur is obtained. After 42 hours at 50° C. the product has 17% of sulphur.

Example 7

The same working procedure is applied as in Example 6, with the same catalyst, but using 1 molecule of isoprene (45 g.) to 1 molecule of oligomer (130 g.) with the same other ingredients. After a reaction period of 26 hours, a polymer containing 31.6% of sulphur is obtained. This polymer does not have a true melting point but a softening range between 110° and 120° C.; it starts to decompose at 260° C.

Example 8

The same working conditions and proportions are used as in Example 7, likewise for 26 hours. Only the temperature is different, namely, 30° C. A product containing only 19% of sulphur is obtained.

Example 9

Under the conditions of Example 7, the proportions are modified so as to have 1 molecule of isoprene to 2 molecules of polythioformaldehyde. This time, a product containing 33% of sulphur is obtained after a reaction period of 26 hours at 50° C.

Example 10

The catalyst of Example 7 is replaced by the system: 5 g. of potassium persulphate and 5 g. of azo-bis-isobutyronitrile, always with the ratio of 1 mole of thioformaldehyde oligomer to 1 molecule of isoprene.

After 26 hours at 50° C., a product is obtained which contains 42.5% of sulphur. It is seen that the addition of azo-bis-isobutyronitrile accelerates the reaction.

Example 11

In Example 10, the isoprene is replaced by 1,3-butadiene, namely 54 g. of this diene to 195 g. of liquid polythioformaldehyde $HS(CH_2S)_nH$, in which the mean value of $n$ is 3.5. After 24 hours at 50° C., a polymer with 39.6% of sulphur is obtained.

Example 12

The polymerisation of 1,5-hexadiene with dithiopolythioether is carried out in an emulsion which contains:

|   | G. |
|---|---|
| Distilled water | 500 |
| 1,5-hexadiene | 82 |
| Liquid polythioformaldehyde oligomer (dithiol polythioether) of formula $HS(CH_2S)_3H$ | 172 |
| Sodium oleate | 10 |
| Polyvinyl alcohol | 5 |

10 g. of azo-bis-isobutyronitrile are added to this well stirred and stable emulsion, while the temperature is kept at 55° C. with a good reflux. The temperature is then raised to 70° C., which is maintained for 15 hours; after this time, the latex obtained is coagulated and the rubber-like mass which has formed is washed and dried. It contains 37% by weight of sulphur.

Example 13

An emulsion similar to that of Example 12 is prepared with the same catalyst, but with 68 g. of divinyl methane (1,4-pentadiene), instead of the 82 g. of 1,5-hexadiene. After efficient turbo-stirring for 20 hours at 45° C. and raising the temperature to 70–80° C. towards the end, a rubber-like mass containing 39.5% by weight of sulphur is obtained by coagulation in methanol.

Example 14

A polymerisation reaction is carried out on an emulsion similar to that of Example 13, in which the divinyl methane is replaced by 96 g. of 2,5-dimethyl-1,5-hexadiene.

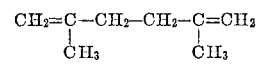

After 20 hours at 70° C. and by coagulation in methanol, a mass containing 34.2% by weight of sulphur is obtained.

In the above examples there were 90 to 192 g. of diene dispersed per litre of water which generally contained 20 to 50 g./l. of sodium oleate or other tensio-active agent, 10 to 40 g./l. of polyvinylalcohol and 4 to 20 g./l. of one or more catalysts; the amount of polythioformaldehyde was 195 to 640 g. per litre. However, these illustrative data are by no means limitative.

I claim:
1. A method for the preparation of diene polymers containing thiomethylene groups, which comprises reacting a conjugated aliphatic diene having from 4 to 30 carbon atoms with a polythioformaldehyde of the formula $HS(CH_2S)_nH$, wherein $n$ is an integer from 2 to 8, in the proportion of from 0.1 to 10 moles of the polythioformaldehyde reactant per mole of the diene reactant and in the presence of a free radical polymerization catalyst, by maintaining the mixture of such materials at temperatures of from 20° to 80° C. until the rubbery polymer product is formed.

2. The method as defined in claim 1, wherein the polythioformaldehyde and diene reactants are admixed in the proportion of from 0.5 to 2 moles of said polythioformaldehyde per mole of said diene, and in which the reaction mixture is maintained at temperatures of from 40° to 80° C. to form the rubbery polymer product.

3. The method as defined in claim 1, wherein the diene reactant has from 4 to 8 carbon atoms and the polythioformaldehyde reactant is $HS(CH_2S)_3H$ or $$HS(CH_2S)_4H$$

4. The method as defined in claim 1, wherein the diene and polythioformaldehyde reactants are admixed in an aqueous emulsion and the emulsion is maintained at temperatures of from 20° to 80° C., with stirring, for from 10 to 40 hours to form the rubbery polymer product, and in which said product is thereafter separated from the aqueous emulsion.

5. The method as defined in claim 1, in which said free radical catalyst is selected from the group consisting of persalts, peroxides, azo-bis-alkyl-nitriles, and Redox catalysts.

6. The method as defined in claim 1, wherein said catalysts is potassium persulphate.

7. A method for the preparation of diene polymers containing thiomethylene groups, which comprises
(a) admixing a polythioformaldehyde reactant of the formula $HS(CH_2S)_nH$, wherein $n$ is 3 or 4, with a conjugated aliphatic diene reactant having from 4 to 8 carbon atoms, in the proportion of from 0.5 to 2 moles of said polythioformaldehyde reactant per mole of said diene reactant, in an aqueous emulsion;
(b) adding a free radical catalyst selected from the group consisting of persalts, peroxides, azo-bis-alkyl-nitriles and Redox catalysts to said emulsion;
(c) maintaining the emulsion at temperatures of from 40° to 80° C., with stirring, for from 10 to 40 hours to produce the desired rubbery polymer product; and
(d) separating the rubbery polymer product thus formed from the aqueous emulsion.

8. The method as defined in claim 7, wherein said catalyst is azo-bis-isobutyronitrile.

9. The method as defined in claim 7, wherein said catalyst is potassium persulphate.

10. The method as defined in claim 7, wherein said catalyst is a Redox catalyst consisting essentially of a mixture of benzoyl peroxide, sodium sulphite and ferrous sulphate.

11. A method for the preparation of diene polymers containing thiomethylene groups, which comprises:
(a) dispersing a diene reactant selected from the group consisting of butadiene and isoprene, and a liquid polythioformaldehyde having the formula $$HS(CH_2S)_3H$$

or $HS(CH_2S)_4H$ in an aqueous emulsion in the proportion of from 90 to 192 grams of said diene reactant and 195 to 640 grams of said polythioformaldehyde reactant per liter of the water content thereof, the aqueous emulsion additionally containing from 20 to 50 grams of sodium oleate and from 10 to 40 grams of polyvinyl alcohol per liter;
(b) adding a free radical catalyst selected from the group consisting of azo-bis-isobutyronitrile, benzoyl peroxide, and potassium persulphate to said emulsion in an amount of from 4 to 20 grams per liter of the water content thereof;
(c) maintaining the aqueous emulsion, with stirring, at temperatures of from 30° to 80° C. for from 10 to 40 hours to form the desired rubbery polymer product; and
(d) separating the rubbery polymer thus formed from said aqueous emulsion.

References Cited

UNITED STATES PATENTS

| | | | |
|---|---|---|---|
| 3,248,403 | 4/1966 | Saegebarth et al. | 260—79 |
| 2,347,182 | 4/1944 | Coffman | 260—79 |
| 2,810,687 | 10/1957 | Rueggeberg et al. | 260—609 |
| 3,030,344 | 4/1962 | Argabright et al. | 260—79 |
| 3,056,841 | 10/1962 | Saegebarth | 260—609 |

OTHER REFERENCES

Gaylord: Polyethers, "Polyalkylene Sulfides and Other Polythioethers," Part III, 1962, Interscience Publishers, New York, pages 7 to 19 and 39.

Marvel et al.: Journal of Polymer Science, vol. 6, pages 717 to 724, January–June 1951.

DONALD E. CZAJA, *Primary Examiner.*

LEON J. BERCOVITZ, *Examiner.*

M. I. MARQUIS, *Assistant Examiner.*